(12) United States Patent
Berger et al.

(10) Patent No.: US 7,436,306 B2
(45) Date of Patent: Oct. 14, 2008

(54) METHOD AND SYSTEM FOR CHECKING COMPLETENESS IN A PACKAGE

(75) Inventors: Dominik Berger, Graz (AT); Dietmar Müller, Graz (AT); Matthias Weitlaner, Lieboch (AU)

(73) Assignee: RF-iT Solutions GmbH, Graz (AT)

( * ) Notice: Subject to any disclaimer, the term of this patent is extended or adjusted under 35 U.S.C. 154(b) by 198 days.

(21) Appl. No.: 11/138,909

(22) Filed: May 25, 2005

(65) Prior Publication Data

US 2005/0263592 A1     Dec. 1, 2005

(30) Foreign Application Priority Data

May 26, 2004   (DE) ................ 10 2004 025 663

(51) Int. Cl.
*G08B 13/14*     (2006.01)

(52) U.S. Cl. ............... 340/572.4; 340/571; 340/572.1; 340/572.8; 340/10.3; 340/825.65

(58) Field of Classification Search ........... 340/571, 340/572.1, 572.8, 10.3, 10.31–10.32, 825.65, 340/825.67
See application file for complete search history.

(56) References Cited

U.S. PATENT DOCUMENTS

| | | | | |
|---|---|---|---|---|
| 5,038,283 A * | 8/1991 | Caveney | ............... | 705/28 |
| 5,537,105 A * | 7/1996 | Marsh et al. | ............ | 340/10.32 |
| 6,288,629 B1 * | 9/2001 | Cofino et al. | ............ | 340/10.1 |
| 6,810,816 B2 * | 11/2004 | Rennard | ............ | 102/430 |
| 6,899,476 B1 * | 5/2005 | Barrus et al. | ............ | 400/76 |
| 6,919,793 B2 * | 7/2005 | Heinrich et al. | ............ | 340/10.32 |
| 6,961,000 B2 * | 11/2005 | Chung | ............ | 340/572.1 |
| 2003/0102970 A1 * | 6/2003 | Creel et al. | ............ | 340/568.1 |
| 2004/0041696 A1 * | 3/2004 | Hull et al. | ............ | 340/10.42 |

FOREIGN PATENT DOCUMENTS

| | | |
|---|---|---|
| DE | 43 13 049 C2 | 10/1984 |
| DE | 202 07 972 U1 | 12/2002 |
| EP | 1 189 163 A2 | 3/2002 |

* cited by examiner

*Primary Examiner*—George A Bugg
*Assistant Examiner*—Son M Tang
(74) *Attorney, Agent, or Firm*—Dickstein Shapiro LLP

(57) ABSTRACT

System and method for checking completeness in a package, which comprises a plurality of objects, which are each provided with at least one electronic information storage medium. The method includes the steps of (a) storing in at least one electronic information storage medium, the total number of objects contained in the package and/or the total number of objects provided for the package; (b) detecting the total number of objects contained in the package by reading the stored value from the at least one electronic information storage medium in which the total number has been stored; (c) counting the objects in the package by reading the electronic information storage media arranged on the objects; and (d) outputting a first predetermined signal if the detected total number is not equal to the counted number and/or a second predetermined signal is output if the detected total number is equal to the counted number.

26 Claims, 3 Drawing Sheets

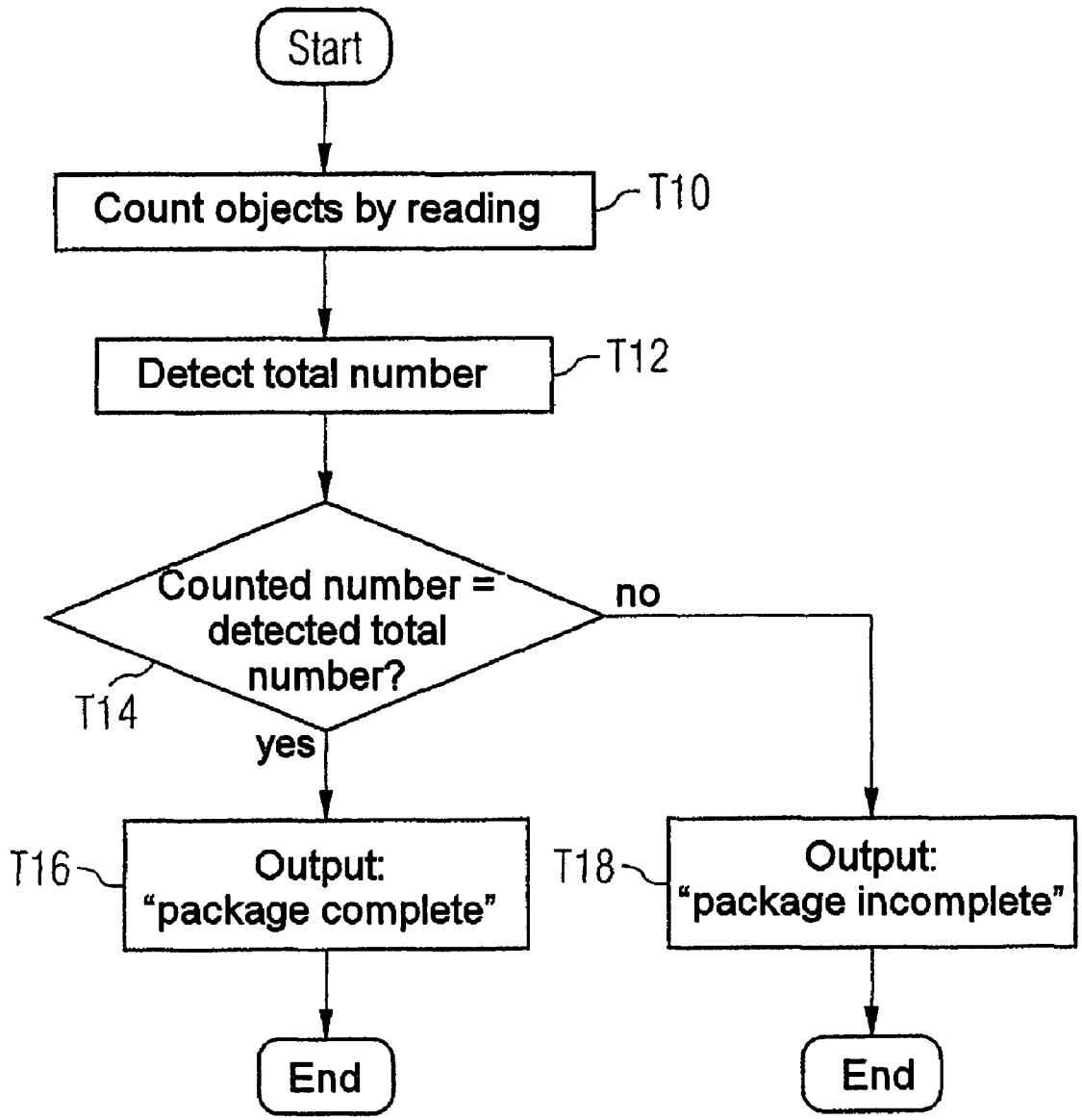

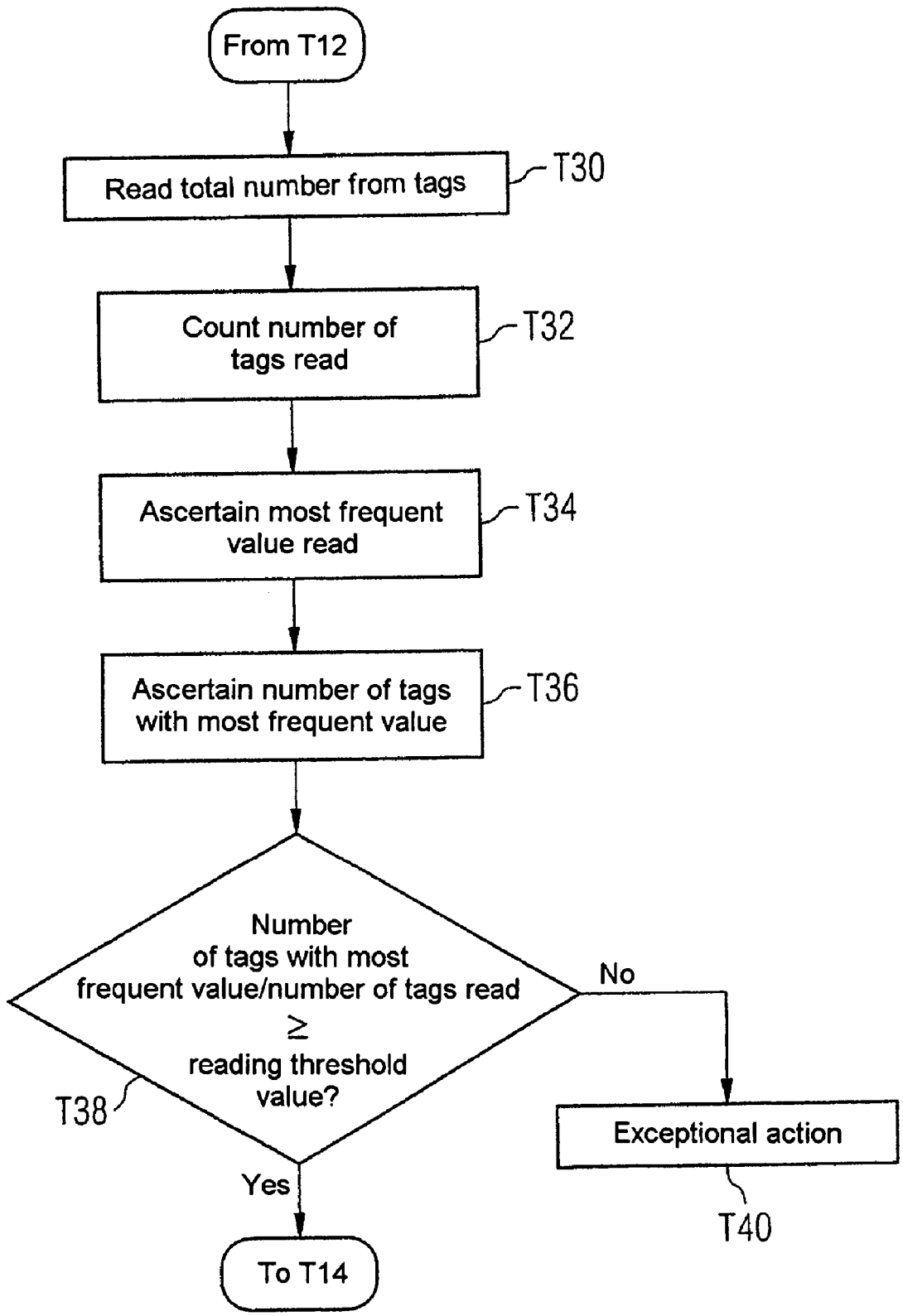

METHOD AND SYSTEM FOR CHECKING COMPLETENESS IN A PACKAGE

CROSS-REFERENCE TO RELATED APPLICATION

This application claims priority to German Patent Application Serial No. 10 2004 025 663.2-27, filed May 26, 2004, and which is incorporated herein by reference in its entirety.

FIELD OF THE INVENTION

The present invention relates to a method and a system for checking completeness in a package.

BACKGROUND OF THE INVENTION

It is known practice to use transponders for marking and identifying objects in a packing unit. In this case, the objects contained in the packing unit are each provided with a transponder. The transponders are detected at a checkpoint using a reader and can be identified. However, it is not possible to state whether the packing unit is complete.

SUMMARY OF THE INVENTION

It is therefore an object of the present invention to provide a method and a system for checking completeness in a package which allow the completeness check in a simple and inexpensive manner.

The invention provides a method for checking completeness in a package, the package comprising a plurality of objects which are each provided with at least one electronic information storage medium (this can be done directly before packing or at another location), where the method comprises the following steps:

preferably at an initialization station:
the total number of objects contained in the package and/or the total number of objects provided for the package is/are stored in at least one electronic information storage medium in or on the package;

preferably at a test station:
the total number of objects contained in the package is detected by reading the stored value from the at least one electronic information storage medium in which the total number has been stored (read value);
the objects in the package are counted by reading the electronic information storage media arranged on the objects (counted value);
a first predetermined signal is output if the detected total number is not equal to the counted number, particularly is less than it, and/or a second predetermined signal is output if the detected total number is equal to the counted number.

The invention also provides a system for checking completeness in a package, particularly for carrying out a method in line with the invention or implementing a preferred embodiment thereof, comprising:

a plurality of objects which are each provided with at least one electronic information storage medium and which form a package;
a writing device, which is preferably arranged at an initialization station, for storing the total number of objects contained in the package in at least one electronic information storage medium in or on the package;
preferably at a test station:
a reading device which is designed
to detect the total number of objects contained in the package by reading the stored value from the at least one electronic information storage medium (read value), and
to count the objects in the package by reading the electronic information storage media which are arranged on the objects (counted value);
a device for outputting a first predetermined signal if the detected total number is not equal to the counted number and/or outputting a second predetermined signal if the detected total number is equal to the counted number.

BRIEF DESCRIPTION OF THE DRAWINGS

Further features, objects and advantages of the present invention will become obvious from the subsequent detailed description of preferred embodiments thereof with reference to the drawings, in which:

FIG. 3A shows a flowchart of a reading operation based on a preferred embodiment of the invention;
and
FIG. 3B shows a flowchart of the preferred course of step T12 from FIG. 3A.

DETAILED DESCRIPTION OF PREFERRED EMBODIMENTS OF THE INVENTION

Figure 1:
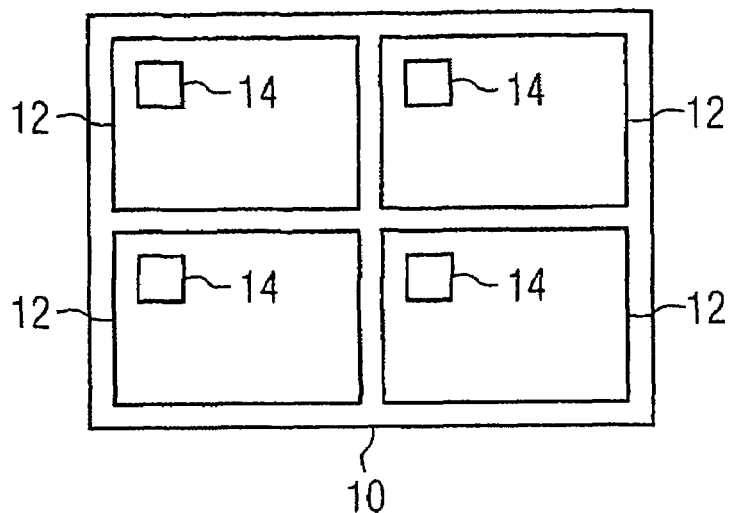
FIG. 1 shows a highly schematic view of a package based on a preferred embodiment of the present invention.

The invention provides a method for checking completeness in a package, the package comprising a plurality of objects which are each provided with at least one electronic information storage medium (this can be done directly before packing or at another location), where the method comprises the following steps:

preferably at an initialization station:
the total number of objects contained in the package and/or the total number of objects provided for the package is/are stored in at least one electronic information storage medium in or on the package;

preferably at a test station:
the total number of objects contained in the package is detected by reading the stored value from the at least one electronic information storage medium in which the total number has been stored (read value);
the objects in the package are counted by reading the electronic information storage media arranged on the objects (counted value);
a first predetermined signal is output if the detected total number is not equal to the counted number, particularly is less than it, and/or a second predetermined signal is output if the detected total number is equal to the counted number.

A package within the context of this invention is, in particular, any grouping or unit comprising a plurality of objects of different or the same type.

The electronic information storage media can be attached to the objects directly before packing or at another location at an earlier point in time.

A completeness check can easily be performed by storing the total number in at least one electronic information storage medium in or on the package and comparing this total number with the number obtained by counting the transponders read. In particular, the information required for a completeness check, i.e. the information regarding how many objects there need to be in the package, is thus available directly when the package is present. In particular, it is not necessary to provide additional transmission options for this information, such as online connections or other information transmission media.

Preferably, an identification number uniquely allocated to the electronic information storage media can be used to determine the number of objects actually contained in the package by reading the identification number contained in the information storage media.

In one preferred embodiment, the storage step comprises a step of storing the total number of objects contained in the package in at least one of the information storage media arranged on the objects.

The information about the total number of objects is thus preferably stored in at least one of the information storage media which is used to identify the objects contained in the package. It is thus not necessary to provide information storage media in addition to the information storage media arranged on the objects for the purpose of storing the total number of objects.

Preferably, the total number of objects contained in the package is stored in at least a number of information storage media arranged on the objects which corresponds to a predetermined writing threshold value.

The information about the total number of objects is thus stored on or in a plurality of information storage media. The writing threshold value may be a percentage proportion of the objects contained in the package, for example. The writing threshold value is preferably 50%, with further preference more than 50%, and with most preference 100% of the objects contained in the package. Any other suitable value may also be used, however.

By storing the information on a plurality of information storage media and thus storing the data in distributed form, it is possible to increase the reliability when detecting information.

With further preference, the method also comprises a step of outputting a predetermined writing error signal or an error message if the writing threshold value has not been reached during the storage step.

It is thus possible to indicate to an operator, for example, that the requested writing or storage operation was not successful. In addition, provision may be made for the writing parameters to be subsequently altered and/or for an instruction to be output to the operator indicating that the writing parameters and/or the position of the package relative to the writing unit and/or the position of the objects within the package need to be altered.

Preferably, the step of detecting the stored total number comprises the following steps:
the total number which is stored in the information storage media arranged on the objects is read, and
the detected total number is stipulated or determined to be the most frequently read value.

The information stored in the respective information storage media about the total number is read and then the most frequently arising value which is read for the detected total number is stipulated. The detected total number is therefore preferably stipulated by means of a majority decision. Errors which have arisen during the write operation can therefore be reduced essentially to a large extent.

In addition, the step of detecting the stored total number may also comprise the following steps:
the number of information storage media (arranged on the objects) from which the total number has been read is determined,
the preferably percentage proportion of the information storage media from which the most frequently read value has been read in relation to the number of information storage media (arranged on the objects) from which the total number has been read is determined, and
preferably comparing the proportion with a predetermined reading threshold value,
the detected total number is stipulated to be the most frequently read value if the determined proportion is greater than or equal to a predetermined reading threshold value.

To increase the certainty level for the detected value of the total number, provision may be made for a predetermined number of read information storage media to have the same value stored. Preferably, the reading threshold value assumes a value of greater than 50%.

Preferably, the method also comprises a step of outputting a predetermined reading error signal or an error message if the determined proportion is less than the reading threshold value.

It is thus possible to indicate to an operator, for example, that a valid statement cannot be made about the total number of objects.

In another preferred embodiment, the step of storing comprises the following steps:
at least one, in particular an additional, electronic sum information storage medium is arranged on or in the package; and
the number of objects contained in the package is stored in the at least one sum information storage medium.

The sum information storage medium can also store information about the entire package.

Provision may also be made for the information about the total number of objects to be stored both in the information storage media arranged on the objects themselves and in the sum information storage medium.

Preferably, the method also comprises a step of storing a unique package identification or ID number in essentially all of the electronic information storage media.

The package identification may be, by way of example, a time stamp, an identification number for a transponder or a number derived therefrom, or a random number. In addition, it is conceivable to use any suitable unique identifier.

The objects belonging to a package can thus be identified in a simple manner. Particularly if a plurality of packages are in the proximity of the reader, it is thus possible to distinguish the association between the objects in various packages.

Preferably, the method comprises a step of ascertaining the package identification of the package which is to be checked, and the steps of the method consider or use only those objects whose package identification corresponds to the ascertained package identification.

In this way, it is possible to ascertain the association between an object and a particular package. To check the completeness of a package, only those objects whose package identification corresponds to the package identification of the package are then considered.

With further preference, the method also comprises a step of providing each object of a package with a serial number.

It might thus be possible to stipulate more accurately which object of the package is not present in the package.

Preferably, the reading and/or storage steps each take place contactlessly.

The electronic information storage media may be transponders, preferably passive transponders and/or radio frequency identification tags or RFID tags.

FIG. 1 shows a highly schematic view of a package 10. The package 10 contains a multiplicity of objects 12. A package 10 within the meaning of this invention is, in particular, any desired grouping of objects 12, which may be of the same type or different. By way of example, a package 10 may be an actual container, such as a carton, which contains objects 12. In addition, a package 10 may likewise be a dispatch or delivery unit comprising a plurality of units or objects 12.

Preferably each of the objects 12 contained in the package 10 is provided with a transponder or RFID-tag 14. The transponders 14 are electronic information storage media which can be written to and/or read contactlessly. The transponders 14 store information about the individual objects 12 and about the package 10 (as described later). The transponders can thus be used to identify the individual objects 12 of a package 10. In particular, the transponders can be used to carry out a check on the completeness of a package, for example after the package has been transported. A method for checking the completeness in line with a preferred embodiment is described in detail below with reference to FIGS. 2 and 3A, 3B.

Figure 2:
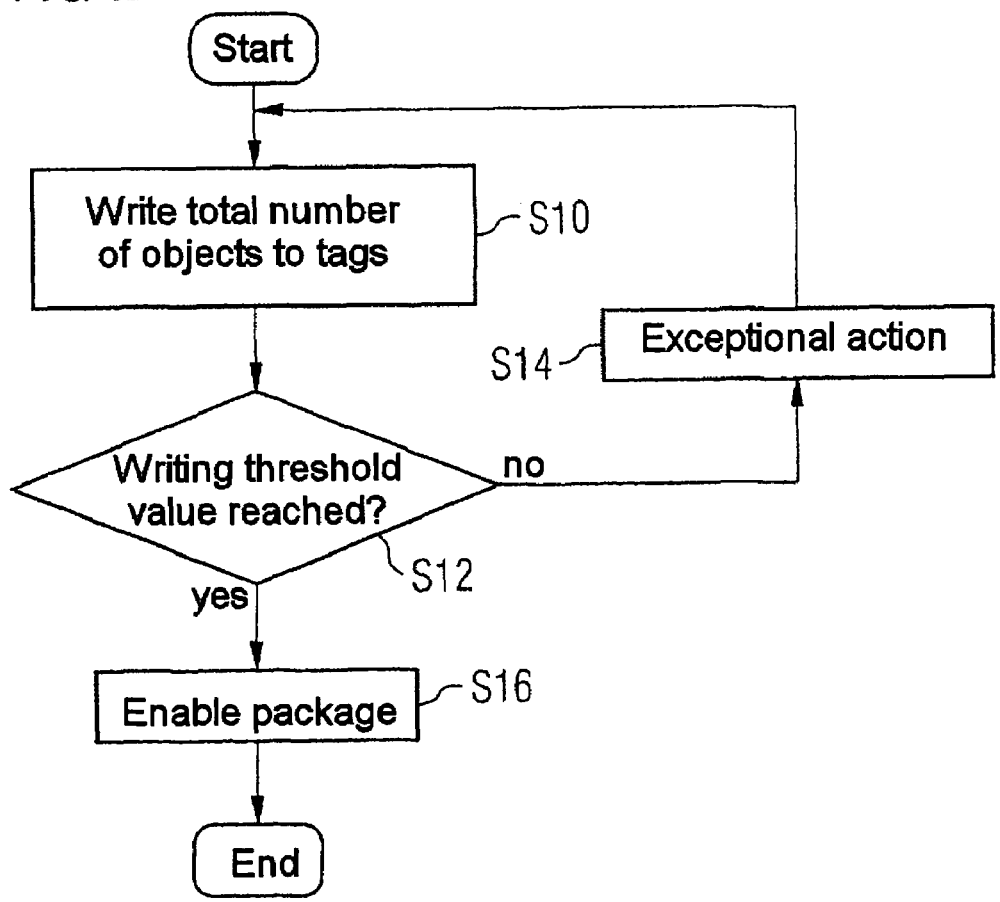
FIG. 2 shows a flowchart of a writing operation based on a preferred embodiment of the invention.

First, the operation of initializing the system for the completeness check at an initialization station is described with reference to FIG. 2. FIG. 2 shows a flowchart of the writing operation or of the initialization operation at the initialization station. The initialization station may be the packing area at the premises of the package dispatcher, for example.

When the individual objects 12 in a package 10 have been compiled or grouped or packed, the total number of objects 12 provided in the package 10 is first of all written to the transponders 14 arranged on the objects 12 in step S10. In this context, the total number has been ascertained in advance by counting the objects 12 of a package 10. Alternatively, the total number may be obtained from the number indicated in an order, for example.

During step S10, it is desirable for the information about the total number to be written to as many transponders as possible. It is most advantageous if the information is stored in essentially all transponders 14. However, it may also be sufficient for the information to be stored in just some or the majority of the transponders 14. Depending on the demand on the reliability of the system, this involves stipulating a "writing threshold value". The writing threshold value is preferably a percentage value which indicates what percentage of the transponders 14 arranged on the objects 12 in a package 10 have had or are intended to have the total number written to them correctly. It is thus possible, by way of example, to stipulate the writing threshold value to be 70%. This means that 70% of the transponders 14 arranged on the objects 12 of a package 10 have had the total number written to them correctly. The writing threshold value is preferably 50% or more, most preferably 100% of the objects contained in the package. By way of example, provision may be made for the writing threshold value to be 60%, 70%, 80% or 90% of the objects contained in the package. It is also possible to use any other suitable value, however. In addition, the writing threshold value may be firmly preset or may be variable.

In step S12, there is a test to determine whether the writing threshold value has been reached. If the writing threshold value has not been reached ("no" in step S12), an exceptional action is carried out in step S14. By way of example, an instruction, e.g. an error message, may be output to the operator. Alternatively or in addition, the operator may be given an instruction to change the position of the package relative to the transponder writing device and/or the position of the objects 12 in the package 10. By way of example, it may not be possible to write some of the transponders 14 on account of the objects 12 being in a shielded position. In addition, the reading conditions and/or the control of conveying devices may be altered.

The writing operation is subsequently repeated (S10), and a fresh check is performed to determine whether the writing threshold value has been reached (S12).

If the writing threshold value has been reached ("yes" in step S12), the package is released in step S16 and can be dispatched, for example.

FIGS. 3A and 3B will now be used to describe the operation of checking the completeness at a test station, for example at the premises of a recipient of the package.

To do this, the package is put into the proximity of a reading device which reads the transponders 14 arranged on the objects 12. In step T10, the objects 12 contained in the package 10 are first counted by reading the transponders 14. By virtue of the transponders 14 preferably each having a unique identifier, it is possible to ascertain the number of objects 12 in the package 10 in a simple manner.

Next, the total number of objects which is stored in the transponders 14, which has been stored in the transponders 14 at the initialization station, is detected in step T12. The operation of detecting the total number is described in detail later with reference to FIG. 3B.

When the total number has been detected, a check is performed in step T14 to determine whether the number counted in step T10 is the same as the total number detected in step T12. If the counted number is the same as the detected total number ("yes" in step T14), then there is an output in step T16 indicating that the package is complete, and the check is ended.

If the counted number is not equal to the detected total number ("no" in step T14), there is an output in step T18 to indicate that the package is incomplete, and the check is ended.

Alternatively, provision may be made that if the counted number is not equal to the detected total number ("no" in step T14) then the reader parameters, such as power, modulation, speed, antenna coordination or actuation, 1 . . . , are first automatically altered by the system in order to increase the likelihood of recognition. If the counted number differs from the detected total number even after appropriate adjustment, provision may also be made for there to be an output to the operator to alter the position of the package in order to remove possible shielding from individual transponders 14. If the counted number is still not equal to the detected total number after these operations then there may be an output, for example, as in step T18 and the operating personnel may be requested to open the package and check it individually.

FIG. 3B will now be used to describe the step of detecting the total number (step T12) in line with a preferred embodiment of the present invention in detail. In this context, the total number of objects which is stored in the transponders 14 is first of all read in step T30. In step T32, the number of transponders 14 from which the total number has been read is then counted. The most frequently read value for the total number is then ascertained in step T34. In particular, writing errors may mean that different values for the total number are stored in the transponders 14. For this reason, the total number detected is ascertained through a majority decision.

In step T36, the number of transponders 14 in which the most frequently read value, ascertained in step T34, was stored is ascertained. In step T38, the number of transponders in which the most frequent value was stored is ascertained relative to the number of transponders ascertained in step T32 with a reading threshold value. In this context, the reading threshold value is a value which indicates the proportion of the most frequently read value for the total number with respect to the values stored overall. In particular, a check is performed to determine whether the proportion of the transponders 14 in which the most frequently read value was stored with respect to the total number of tags read is greater than or equal to the reading threshold value. By way of example, the reading threshold value may be between 51 and 100%, which means that the most frequently read value needs to be stored in more than half of the transponders 14 in which the total number was stored.

If the percentage proportion is greater than or equal to the reading threshold value ("yes" in step T38), the method proceeds to step T14. If, by contrast, the proportion is less than the reading threshold value ("no" in step T38), then no reliable statement can be made about the total number of objects 12 originally contained in the package 10. In this case, provision is made for an exceptional action (step T40). By way of example, the operator may be asked to open the package, to count the objects or record them individually and, by way of example, to compare them with the enclosed docket data (electronically or in paper form) or to ask the dispatch station or initialization station how many objects the package should contain. Alternatively or in addition, the reading conditions and/or the control of the reading conditions can be altered. Provision may also be made for the data to be captured nevertheless and for an error warning or message to be output.

In summary, it can be said that the method and system described above can be used to increase the system reliability in relation to the completeness of a package. In particular, this involves storing the information regarding how many objects there are in a package in as many transponders 14 of objects 12 arranged in the package 10 as possible.

By storing the additional package information on the transponders 14 which are already arranged on the objects 12 anyway, it is possible to increase the system reliability without needing to provide additional transponders.

Alternatively, provision may be made for the total number of objects 12 contained in a package 10 to be stored at the initialization station in a sum information transponder. Such a sum information transponder is preferably a transponder which is provided in addition to the transponders 14 provided on the objects 12 and which is fitted in/on the package and contains information about the package. When the sum information transponder is used, it is possible to dispense with the detection of the total number through a majority decision.

Preferably, each transponder 14 of the objects 12 in a package 10 is also used to store a unique package identification which can be used to ascertain the association between an object 12 and a particular package 10. Particularly when there are a plurality of packages in the proximity of the reading unit, it is thus possible to ascertain the association between an object 12 and a particular package 10 in a simple manner.

In addition, each object 10 in a package 12 can be identified by a serial number.

Provision may also be made for information which is put on a packing label likewise to be stored in a manner distributed over a plurality of transponders 14.

What is claimed is:

1. A method for checking completeness in a package, which comprises a plurality of objects, which are each provided with at least one electronic information storage medium, the method comprising:
    storing in at least one electronic information storage medium of the electronic information storage media arranged on the objects at least one of, a total number of objects contained in the package and a total number of objects provided for the package;
    detecting the total number of objects contained in the package by reading the stored value from the at least one electronic information storage medium in which the total number has been stored;
    counting the objects in the package by reading the electronic information storage media arranged on the objects;
    outputting a first predetermined signal if the detected total number is not equal to the counted number; and
    outputting a second predetermined signal if the detected total number is equal to the counted number.

2. The method as claimed in claim 1, wherein the total number of objects contained in the package is stored in at least a plurality of information storage media arranged on the objects, and wherein a percentage of the information storage media which are arranged on the objects in the package and which are to have the total number of objects contained in the package stored therein, corresponds to a predetermined writing threshold value.

3. The method as claimed in claim 2, further comprising outputting a predetermined writing error signal if the writing threshold value has not been reached during the storage step.

4. The method as claimed in claim 1, wherein the step of detecting the stored total number comprises:
    reading the total number which is stored in the information storage media arranged on the objects; and
    stipulating the detected total number to be the most frequently read value.

5. The method as claimed in claim 4, wherein the step of detecting the stored total number further comprises:
    determining the number of information storage media, which are arranged on the objects, from which the total number has been read;
    determining the proportion of the information storage media from which the most frequently read value has been read in relation to the number of information storage media, which are arranged on the objects, from which the total number has been read; and
    stipulating the detected total number to be the most frequently read value if the determined proportion is greater than or equal to a predetermined reading threshold value.

6. The method as claimed in claim 5, further comprising outputting a predetermined reading error signal if the determined proportion is less than the reading threshold value.

7. The method as claimed in claim 1, wherein the storage step comprises:
    arranging at least one electronic sum information storage medium on the package; and
    storing in the at least one electronic sum information storage medium the number of objects contained in the package.

8. The method as claimed in claim 1, further comprising storing a unique package identification in essentially all of the electronic information storage media.

9. The method as claimed in claim 8, further comprising ascertaining the package identification of the package which is to be checked, and wherein the steps of the method use only those objects whose package identification corresponds to the ascertained package identification.

10. The method as claimed in claim 1, further comprising providing each object of a package with a serial number.

11. The method as claimed in claim 1, wherein at least one of the reading step and the storage step takes place contactlessly.

12. The method as claimed in claim 1, wherein the electronic information storage media are radio frequency identification tags.

13. A system for checking completeness in a package, comprising:
- a plurality of objects which are each provided with at least one electronic information storage medium and which form a package;
- a writing device for storing in at least one electronic information storage medium of the electronic information storage media arranged on the objects, at least one of a total number of objects contained in the package and a total number of objects provided for the package;
- a reading device which is designed to:
  - detect the total number of objects contained in the package by reading the stored value from the at least one electronic information storage medium, and
  - count the objects in the package by reading the electronic information storage media which are arranged on the objects; and
- a device for outputting a first predetermined signal if the detected total number is not equal to the counted number, and for outputting a second predetermined signal if the detected total number is equal to the counted number.

14. A system for checking completeness in a package, comprising:
- a plurality of objects, which are each provided with at least one electronic information storage medium;
- a writing means for storing in at least one electronic information storage medium of the electronic information storage media arranged on the objects, at least one of a total number of objects contained in the package and a total number of objects provided for the package;
- a reading means for:
  - detecting the total number of objects contained in the package by reading the stored value from the at least one electronic information storage medium in which the total number has been stored, and
  - counting the objects in the package by reading the electronic information storage media arranged on the objects; and
- a means for outputting a first predetermined signal if the detected total number is not equal to the counted number and for outputting a second predetermined signal if the detected total number is equal to the counted number.

15. The system as claimed in claim 14, wherein the total number of objects contained in the package is stored in at least a plurality of information storage media arranged on the objects, and wherein a percentage of the information storage media which are arranged on the objects in the package and which are to have the total number of objects contained in the package stored therein, corresponds to a predetermined writing threshold value.

16. The system as claimed in claim 15, further comprising a means for outputting a predetermined writing error signal if the writing threshold value has not been reached during the storage step.

17. The system as claimed in claim 14, wherein the reading means comprises:
- a means for reading the total number which is stored in the information storage media arranged on the objects; and
- a means for stipulating the detected total number to be the most frequently read value.

18. The system as claimed in claim 17, wherein the reading means comprises:
- a means for determining the number of information storage media, which are arranged on the objects, from which the total number has been read;
- a means for determining the proportion of the information storage media from which the most frequently read value has been read in relation to the number of information storage media, which are arranged on the objects, from which the total number has been read; and
- a means for stipulating the detected total number to be the most frequently read value if the determined proportion is greater than or equal to a predetermined reading threshold value.

19. The system as claimed in claim 18, further comprising a means for outputting a predetermined reading error signal if the determined proportion is less than the reading threshold value.

20. The system as claimed in claim 14, wherein the writing means comprises:
- a means for arranging at least one electronic sum information storage medium on the package; and
- a means for storing in the at least one electronic sum information storage medium the number of objects contained in the package.

21. The system as claimed in claim 14, further comprising a means for storing a unique package identification in essentially all of the electronic information storage media.

22. The system as claimed in claim 21, further comprising a means for ascertaining the package identification of the package which is to be checked.

23. The system as claimed in claim 14, further comprising a means for providing each object of a package with a serial number.

24. The system as claimed in claim 14, wherein the reading and the writing means read and store contactlessly.

25. The system as claimed in claim 14, wherein the electronic information storage media are radio frequency identification tags.

26. A system for checking completeness in a package, which comprises a plurality of objects, which are each provided with at least one electronic information storage medium, the system comprising:
- a processor;
- a memory communicatively coupled to the processor; and
- software executing in the processor configured to:
  - a) store in at least one electronic information storage medium of the electronic information storage media arranged on the objects, at least one of a total number of objects contained in the package and a total number of objects provided for the package;
  - b) detect the total number of objects contained in the package by reading the stored value from the at least one electronic information storage medium in which the total number has been stored;
  - c) count the objects in the package by reading the electronic information storage media arranged on the objects;
  - d) output a first predetermined signal if the detected total number is not equal to the counted number; and
  - e) output a second predetermined signal if the detected total number is equal to the counted number.

* * * * *